United States Patent [19]

Lee

[11] Patent Number: 4,713,818

[45] Date of Patent: Dec. 15, 1987

[54] OPTICAL BISTABLE DEVICE

[75] Inventor: Chun-Sheu Lee, Torrance, Calif.

[73] Assignee: Amada Engineering & Service Co., Inc., La Mirada, Calif.

[21] Appl. No.: 678,296

[22] Filed: Dec. 5, 1984

[51] Int. Cl.⁴ .................................................. H01S 3/00
[52] U.S. Cl. ............................................. 372/8; 372/95
[58] Field of Search ........................................ 372/8, 95

[56] References Cited

U.S. PATENT DOCUMENTS 3,610,731 10/1971 Seidel .................................... 372/8
3,813,605 5/1974 Szoke ..................................... 372/8

OTHER PUBLICATIONS

Kortz, H. P. et al, "Stability and Beam Divergence of Multimode Lasers with Internal Variable Lenses", Dec. 1, 1981, vol. 20, No, 23, pp. 4124-4134 of Applied Optics.

*Primary Examiner*—James W. Davie
*Attorney, Agent, or Firm*—Wigman & Cohen

[57] ABSTRACT

A method of operating and apparatus for an optical bistable device is disclosed in which an active laser medium is placed between two mirrors within an optical resonator and bistable switching is achieved by operating the active resonator across the transition borderline between the stable and unstable resonator regions. Several different embodiments are disclosed.

18 Claims, 14 Drawing Figures

OPTICAL BISTABLE DEVICE

BACKGROUND OF THE INVENTION

This invention relates to an optical bistable device (OBC) for inherent potential applications such as optical switching, optical memory, bistable logic, differential amplification, optical transistor, discrimination, clipping, limiting, pulse shaping, and for performing a number of optical digital data processing functions. More specifically, the present invention relates to an optical bistable device in which an active laser medium is placed between two mirrors within an optical resonator whereby bistable switching is provided by operating the active resonator across the transition borderline between the stable-unstable resonator regions.

In conventional optical bistable devices (OBC), nonlinear Fabry-Perot resonators containing saturable absorbers or nonlinear refractive-index material are utilized. A schematic diagram of such a device is shown in FIG. 1(a) wherein a laser beam is used for power input. Typical characteristics of such an optical bistable system are illustrated in FIG. 1(b).

This type of optical bistable device is referred to as "intrinsic system". U.S. Pat. No. 3,610,731, issued on Oct. 5, 1971 to H. Seidel and U.S. Pat. No. 3,813,605, issued on May 28, 1974 to A. Szoeke, both disclose an intrinsic system containing saturable absorbers. Nonlinear Fabry-Perot resonators containing nonlinear refractive index materials were demonstrated and described by Gibbs et al in 36 *Phys. Rev. Lett.* 1135 (1976). The phenomenon appearing in one of such intrinsic systems is described in "Laser Focus", April 1982, page 79, which is incorporated herein by reference.

Another type of optical bistable device involves a so-called hybrid system. In contrast to the intrinsic systems mentioned above, the microscopic nonlinearity in hybrids is synthesized using electro-optic feedback. The hybrid optical bistable containing a medium with a nonlinear refractive index and an electrical feedback loop was initially suggested and experimentally illustrated by Smith and Turner in 30 *Appl. Phys. Lett.* 280 (1977). An example of an electro-optic hybrid analogue of a dispersive optical bistable device is shown in FIG. 2. The operating principle of such systems is described in "Laser Focus", April 1982, page 81, which is incorporated herein by reference.

As mentioned above, various types of optical bistable devices which have so far been demonstrated in either hybrid or intrinsic systems require nonlinear refraction as the microscopic nonlinearity. For intrinsic optical bistable systems, an external laser is generally required for operation because of the need for high intensity and/or interference, while hybrid systems which could be driven by a broad band source require electro-optic feedback circuits.

More specifically, in the nonlinear Fabry-Perot resonators containing saturable absorbers, which can be referred to as absorptive OB, comparatively large changes in absorption are required to give rise to absorptive bistability. Generally, it is difficult to produce absorptive OB because the absorber must saturate to a low level of residual absorption as described in "Laser Focus", April 1982, on page 81.

The Fabry-Perot resonator containing nonlinear refractive index material, which can be referred to as dispersive OB, requires nonlinear media showing a large intrinsic nonlinear index of refraction which is difficult to find. In addition, those systems requiring multiple-beam interference need relatively coherent light and hence will generally require external lasers for their operation.

For the hybrid optical bistable system, since the microscopic nonlinearity required in the cavity is synthesized by using electro-optic feedback, the switching speed of the device is generally limited. In addition, an external laser beam is required in most of the hybrid optical bistable systems.

Now, in the study of input vs. output power characteristics of a flashlamp-pumped Nd:GGG rod geometry laser, the present inventor has observed that the output laser power increases with increasing flashlamp input power. As the flashlamp input power exceeds a certain power level, the laser output power is reduced to an insignificant level and laser action ceases if the input power is further increased. At that stage, the flashlamp input power is reduced and no laser action is observed until the input power decreases to a second power level which is smaller than the certain power level. As the input power is further reduced below the second power level, laser action resumes. A hysteresis effect is reproducible.

This OB phenomenon has not been noticed so far in prior art laser resonators, which may be because of the fact that laser operation in the region of stable-unstable configuration transition has never been carefully studied.

The present discovery led to the development of a more general concept for active optical bistable laser devices, as described herein.

SUMMARY AND OBJECTS OF THE INVENTION

Accordingly, it is a primary object of the present invention to provide an optical bistable device which overcomes the shortcomings of prior art optical bistable devices as mentioned above.

Another object of the present invention is to provide a new class of optical bistable devices which requires neither a saturable absorber nor nonlinear refractive-index material in the resonator.

Yet another object of the present invention is to provide an innovative type of optical bistable device which requires no electro-optic feedback.

Still another object of the present invention is to demonstrate optical bistable effects with an incoherent, broad band source or even with non-optical means.

Another object of the present invention is to provide a new type of active bistable optical device which is composed simply of a Fabry-Perot resonator and an active laser medium with an excitation source.

Briefly described, the present optical bistable device comprises an optical resonator comprising a pair of mirrors and an active laser medium exhibiting lens effects between the mirrors, and a light source, wherein laser-action-induced focusing or defocusing in the active laser medium provides the feedback necessary for optical bistability and hysteresis effects even with the use of noncoherent light sources.

With these and other objects, advantages and features of the invention that must become hereinafter apparent, the nature of the invention must be more clearly understood by reference to the following detailed description of the invention, the appended claims and to the several drawings attached herein.

DETAILED DESCRIPTION OF THE PREFERRED EMBODIMENT

Figure 1A:
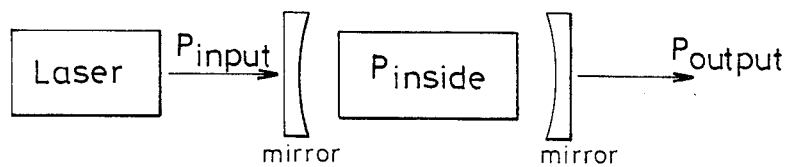
FIG. 1(a) is a schematic illustration of a prior art optical bistable system of the intrinsic type.
Figure 1B:
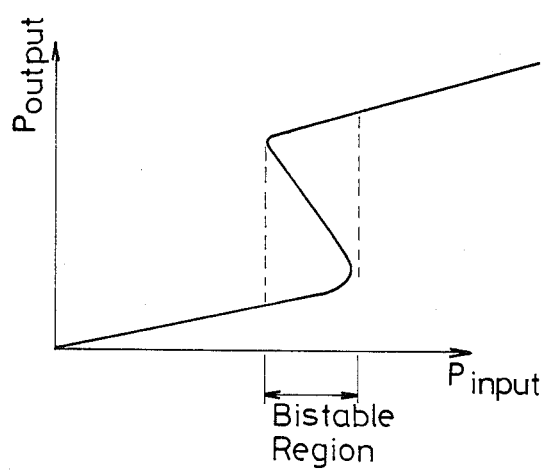
FIG. 1(b) is a graph illustrating typical characteristics of the optical bistable system of FIG. 1(a)
Figure 2:
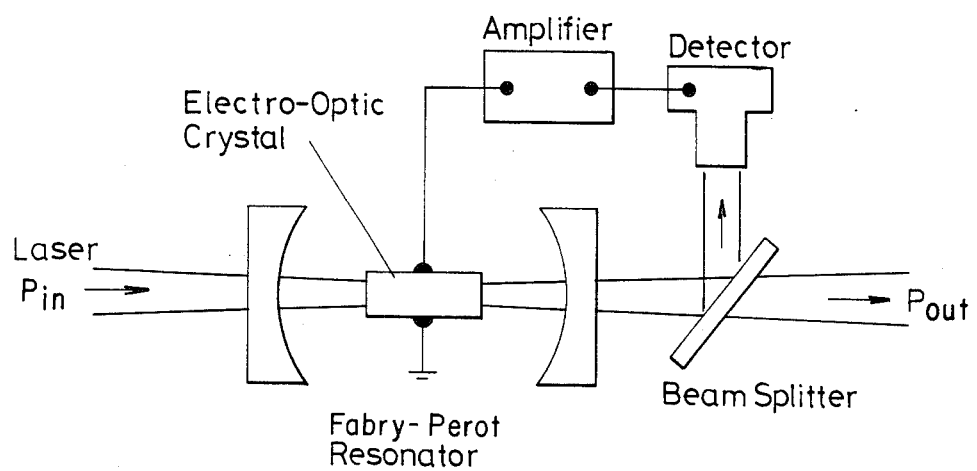
FIG. 2 is a schematic illustration of a prior art optical bistable system of the hybrid type.
Figure 3:
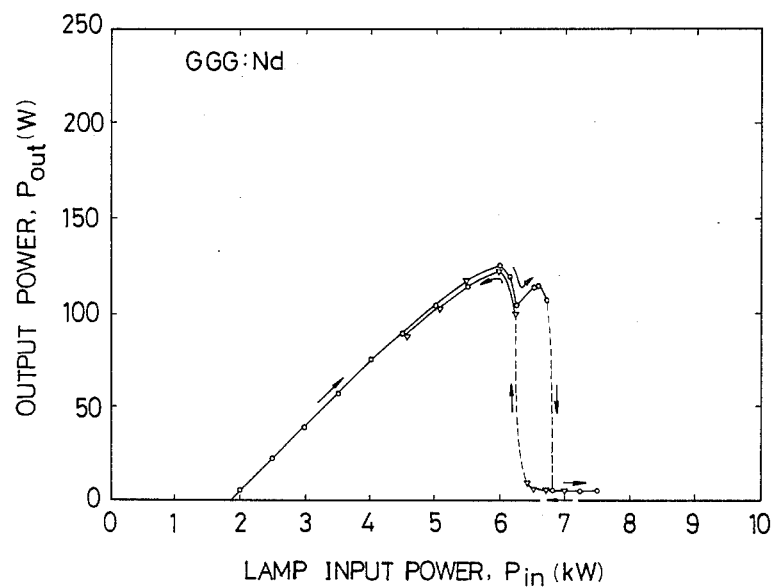
FIG. 3 is a graph showing input vs output power characteristics of a flashlamp-pumped Nd:GGG rod geometry laser.

As mentioned previously, in the study of input vs output power characteristics of a flashlamp-pumped Nd:GGG rod geometry laser, the present inventor has observed that the output laser power increases with increasing flashlamp input power. As the flashlamp input power exceeded a certain level denoted by $P_{in}$(down) as shown in FIG. 3, the laser output power was reduced to an insignificant level and laser action ceased if the input power was further increased. At that stage, the flashlamp input power was reduced and no laser action was observed until the input power decreased to a level denoted by $P_{in}$(up) which was smaller than $P_{in}$(down). As the input power was further reduced below $P_{in}$(up), laser action resumed. A hysteresis effect was clear and reproducible. That discovery has led to the present invention, some embodiments of which are described hereinafter.

Surprisingly, the active optical bistable device of the present invention does not need coherent light, for it exhibits optical bistable characteristics in response to even incoherent input light. In addition, the laser medium of the present active optical bistable device per se exhibits the optical bistable characteristics, so that the present device does not need any electro-optic feedback.

The laser medium may be a gas (e.g. $CO_2$, $N_2$, $H_3$, etc.), a liquid (e.g. organic dye) or a solid (e.g. activated laser crystals such as YAG, GGG, Ruby, GSGG, etc.), or semiconducting materials (such as GaAs, etc.).

Figure 4:
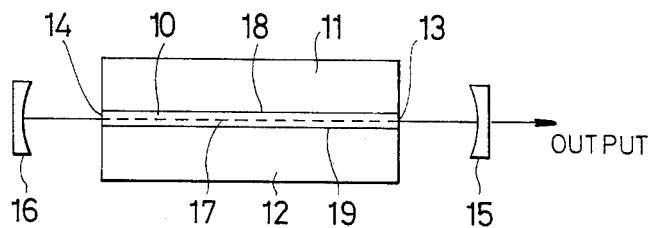
FIG. 4 is a schematic elevational view of one embodiment of the present invention being of a thin rectangular slab shape.

Referring now in detail to the drawings, wherein like parts are designated by like reference numerals throughout, there is illustrated in FIG. 4 a homogeneous active medium 10 in thin rectangular slab with pump sources 11 and 12 on the opposite sides thereof for excitation of the active medium 10. In one embodiment, the medium may comprise neodymium doped YAG (yttrium aluminum garnet), GGG (gadolinium gallium garnet), or GSGG (gadolinium scandium gallium garnet), or other activated laser crystals, while the pump sources 11 and 12 may comprise flashlamps or an LED (light emitting diode) array.

Two optically plane parallel end faces 13 and 14 at each longitudinal end of slab 10 of active medium are coated with antireflection (AR) thin film at the lasing wavelength of the active medium 10. Mirrors 15 and 16 form an optical cavity which provides feedback for laser action in the medium 10. The surface toward the resonator cavity of mirror 16 has a high reflectivity (HR) coating while that of mirror 15 has a partially transmissive coating. The radii of curvature of mirrors 15 and 16 are properly selected depending upon the operating condition of the bistable switching. Extending parallel to the longitudinal axis 17 of the body are two planes 18 and 19 to produce a channel for excitation of the active medium 10. The width of the active medium 10 is much larger than its thickness.

The thickness of the active medium 10 is properly chosen such that the resonator can only allow the lowest order (spatial) mode to oscillate.

In order to explain the basic principles of the invention, the theory necessary to analyze resonators that contain optical elements other than the end mirrors will first be explained. That theory will then be applied to the case of a resonator containing a laser medium. Under excitation, the laser medium acts like a lens of an effective focal length, $f_{eff}$, which may be either positive or negative depending upon the laser medium and excitation processes.

The pertinent parameters of a resonator equivalent to one with an internal thin lens are:

$$g_1 = 1 - L_2/f - L_0/R_1 \quad g_2 = 1 - L_1/f - L_0/R_2 \quad (1)$$

where $L_0 = L_1 + L_2 - (L_1 L_2/f)$ and f is the focal length of the internal lens; $L_1$ and $L_2$ are the spacings between mirrors $M_1$, $M_2$ and the lens; and $R_1$ and $R_2$ are the radii of curvature of mirrors $M_1$, $M_2$.

The stability condition of the active resonator can be then expressed by:

$$0 < g_1 g_2 < 1 \quad (2)$$

Figure 12:
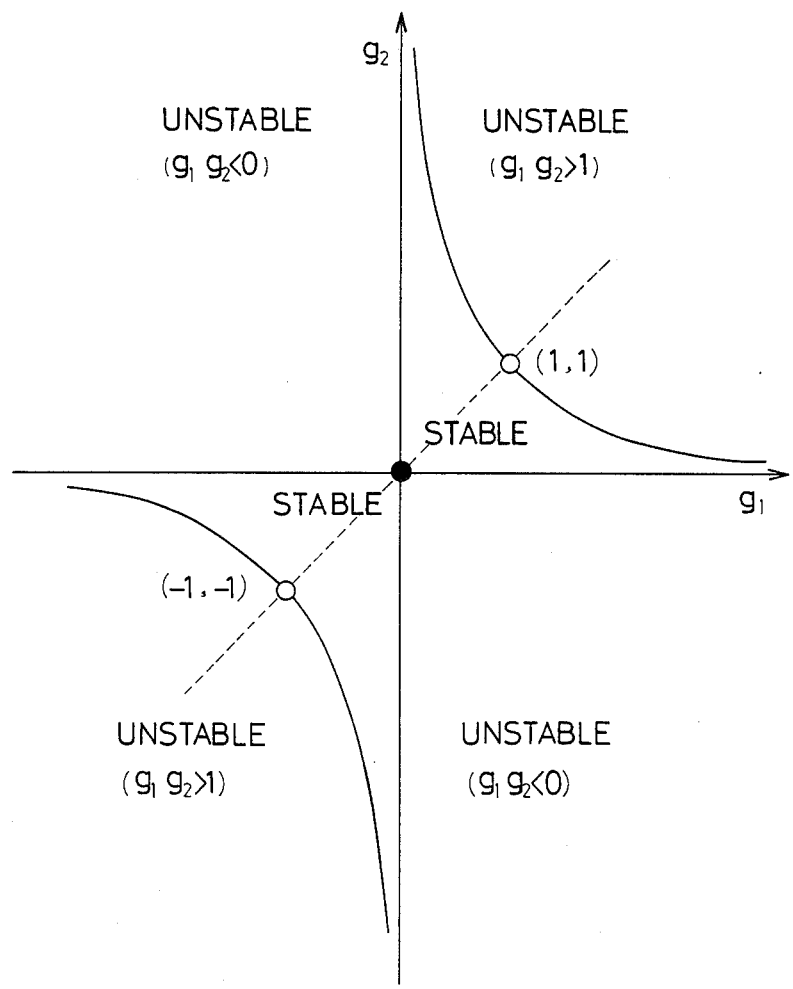
FIG. 12 is a graph illustrating stable and unstable cavity configurations for the resonator of an optical bistable device in accordance with the invention.

All cavity configurations are unstable unless they correspond to points lying in the area, as illustrated by FIG. 12, enclosed by a branch of the hyperbola $g_1 g_2 = 1$ and the coordinate axes $g_1 g_2 = 0$. The research in the prior art is substantially directed to the stable region.

The general theory of optical bistability of this invention is as follows. There is a laser medium whose effective focal length, $f_{eff}$ depends upon both the pump (excitation) input power, $P_{in}$, and the laser power in the resonator $P_{ls}$. It is presumed that the condition in the precise function form of $f_{eff}$ against $P_{in}$ and $P_{ls}$ is written in its most general form:

$$1/f_{eff} = 1/f(P_{in}) + 1/f(P_{ls}); \quad (3)$$

where $f(P_{in})$ and $f(P_{ls})$ are the focal lengths due to pump- and laser-induced focusing (or defocusing) of the resonator, respectively. Note that both $f(P_{in})$ and $f(P_{ls})$ may be either positive or negative.

The pump-induced lens effect may arise from nonuniform gain distribution due to nonuniform pumping, nonuniform temperature distribution and thermally-induced distortion. On the other hand, the laser-induced lens effect may be a result of a self-focusing (or self-defocusing), transverse spatial hole burning, heating of laser medium due to an absorption or laser energy, and optical distortion of the resonator mirrors due to local heating by laser radiation.

Equation (3) is the key expression for optical bistability in the novel features of this invention. The effective focal length of the laser medium can presumably be expressed by equation (3) due to pump- and laser-action-induced lensing effects as mentioned above. As a result, the cavity g parameters of the active resonator as shown in equation (1) depend upon both the pump power and the laser power. In other words, under the same pumping conditions, the cavity g parameters with laser action taking place have different values from those without laser oscillation in action.

The cavity g parameters have subsequent influence on the laser operation of the active resonator as shown in equation (2). The active resonator can generate coherent light output if the stability condition of the g parameters as shown in equation (2) is met. Under the circumstances when either $g_1g_2 > 1$ or $g_1g_2 < 0$ is satisfied, the cavity configuration becomes unstable and laser action ceases. The condition specified by $g_1g_2 = 0$ or $g_1g_2 = 1$ sets the borderline between the regions of stable and unstable configurations of the resonator.

As the operating condition of the active resonator, which changes with both input power and laser power, crosses the borderline, the active resonator undergoes a phase transition, i.e. stable-unstable configuration transition or lasing-nonlasing state transition, where optical switching occurs. Note that the functions of the pump sources are two-fold. First, they produce population inversion (i.e. gain) in the laser medium, and secondly, they create a lensing effect in the laser medium, as shown by the first term on the right hand side of equation (3). In addition, the pump sources may take several different forms. For example, they may be in the form of a noncoherent light, e.g. a flash-lamp in a solid-state (YAG, ruby, or GGG) laser or in the form of an electrical current, e.g. the injection current in a semiconductor laser.

Figure 8:
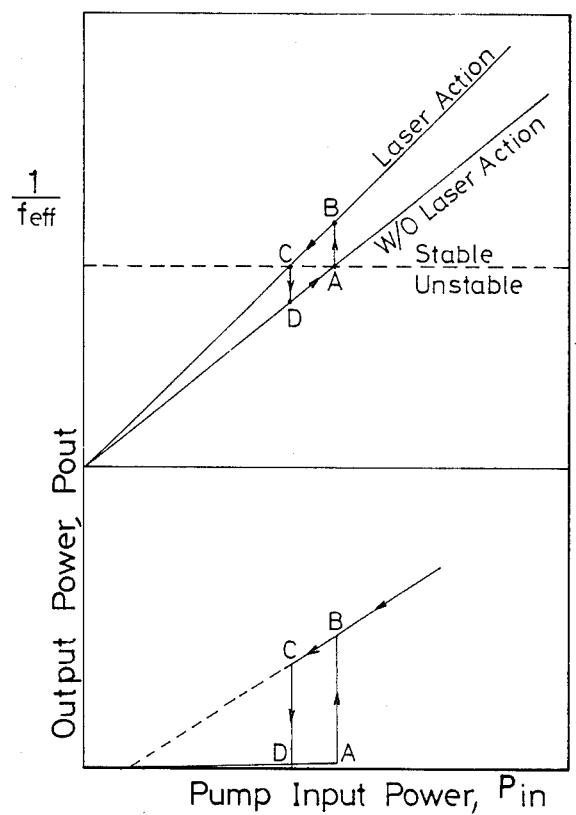
FIG. 8 is a graph illustrating a relationship between the input power and the effective focal length and bistable switching or optical bistability of the present invention under the conditions where both $f(P_{in})$ and $f(P_{ls})$ are positive and wherein $f(P_{in})$ and $f(P_{ls})$ are the focal length due to pump and laser induced focusing of the resonator.

The conditions for bistability (hysteretic behavior) of this invention depend upon the signs (positive or negative) of $f(P_{in})$ and $f(P_{ls})$. Using a graphing method (see FIG. 8), the value of $1/f_{eff}$ is plotted against $P_{in}$ with laser action as a parameter. The borderline condition for stable-unstable resonator transition (i.e., $g_1g_2 = 1$ or $g_1g_2 = 0$) can be obtained from Eq. (1), which is indicated by the dashed line in FIG. 8. Note that both $f(P_{in})$ and $f(P_{ls})$ are positive in this case.

The regenerative action underlying the switching is as follows. Increasing the pump input power, $P_{in}$, increases the $1/f_{eff}$ value which is equal to $1/f(P_{in})$. Since the resonator is unstable, there is no laser action for $P_{in}$ below point A. At point C, the resonator condition changes from a stable to an unstable state and laser action ceases, which is indicated by the transition from point C to point D. The bistable switching is clearly seen.

Figure 9:
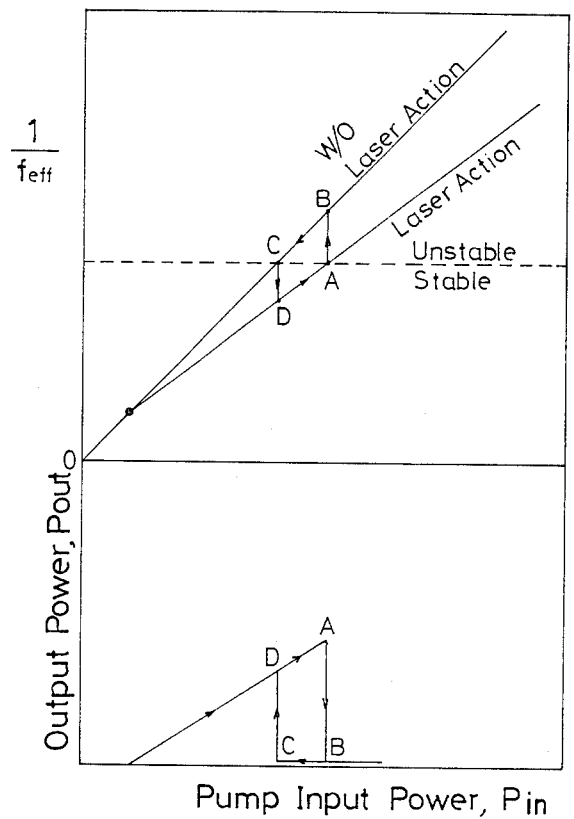
FIG. 9 is a graph similar to FIG. 8 for the situation where $f(P_{in})$ is positive and $f(P_{ls})$ is negative.
Figure 10:
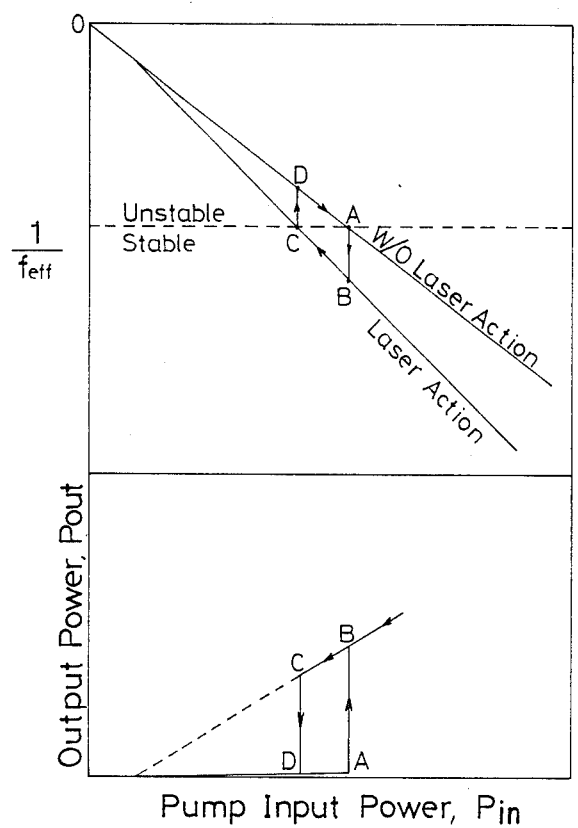
FIG. 10 is a graph similar to FIG. 8 for the situation where both $f(P_{in})$ and $f(P_{ls})$ are negative.
Figure 11:
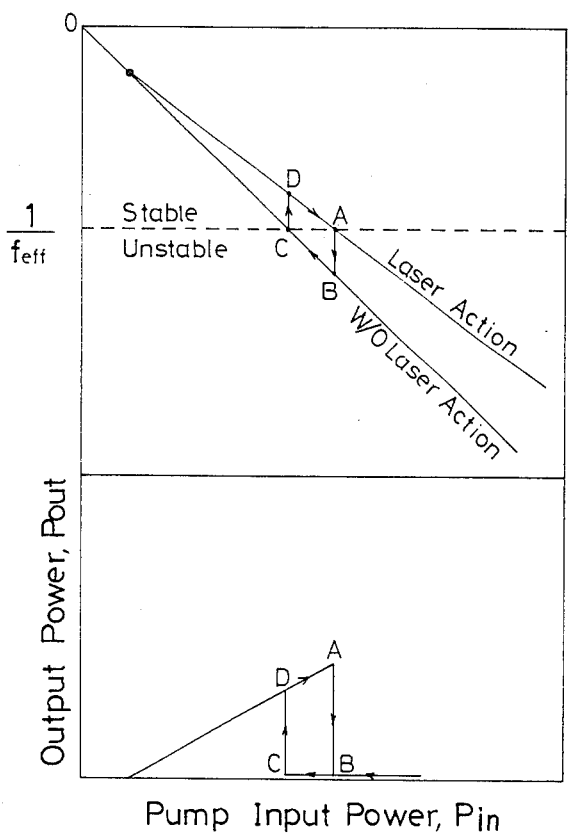
FIG. 11 is a graph similar to FIG. 8 for the situation where $f(P_{in})$ is negative and $f(P_{ls})$ is positive.

FIG. 9 shows bistable switching under the conditions where $f(P_{in})$ is positive and $f(P_{ls})$ is negative. FIG. 10 describes the hysteretic behavior for the situation where both $f(P_{in})$ is negative and $f(P_{ls})$ is positive.

In order to clearly explain the present invention over the prior art intrinsic optical bistable system, some features are compared as follows.

The optical resonator used in the intrinsic (passive) OB system is designed to provide a cavity for interference to take place such that the nonlinear Fabry-Perot interferometer can produce a transmission spectrum for the external laser beam where maximum transmission occurs under the condition that the external laser beam is on-resonance with the passive cavity while minimum transmission takes place under the condition that the external laser beam is off-resonance with the passive cavity, whereas the optical resonator used in the present invention is designed to provide an optical feedback in the active cavity for laser action to occur.

In the prior art laser resonators, most of the efforts which have been made so far are directed to maintain the cavity g parameters at the same values throughout the operating region of the laser in order to retain constant laser beam parameters, e.g., spatial modes and beam divergence. Whereas, in the present invention, the operation of the laser resonator is designed in such a way that its cavity g parameters change with the operating conditions and deliberately make the g parameters cross the borderline for the stable-unstable configuration of the resonator as the operating condition varies to achieve the ON-to-OFF and OFF-to-ON transitions of laser action.

Additional embodiments of the present optical bistable devices are described as follows, showing modifications of the present invention.

Figure 5:
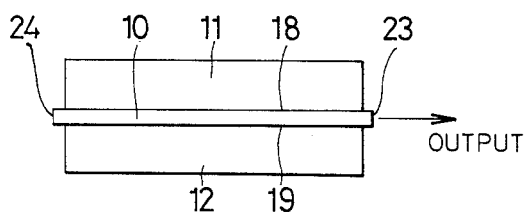
FIG. 5 is a schematic elevational view of another embodiment of the present invention.

The features of the embodiment shown in FIG. 5 are similar to those described in FIG. 4 except that the cavity mirrors are not used and the end faces 23 and 24 of the active medium 10 are constructed as cavity mirrors for laser oscillation. The end face 24 has a high reflectivity (HR) coating on it whereas the end face 23 is coated with partially transmissive film for output.

Figure 6:
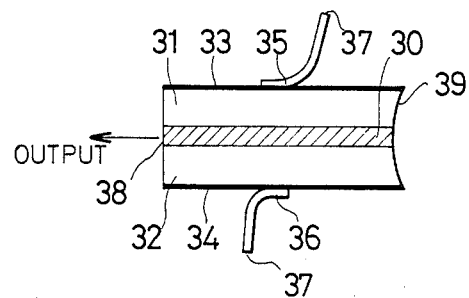
FIG. 6 is a schematic elevational view of still other embodiments of the present invention.

Referring now to FIG. 6, another embodiment of the present invention comprises a rectangular semiconducting crystal (e.g. GaAs). The active laser region 30 is in the p-n junction between the p-type region 31 and the n-type region 32. Two plane faces 33 and 34 are metallized for making contact with bias leads 35 and 36 through which the injection current 37 provides gain for the active medium in the p-n juction region 30. Two optical end faces 38 and 39 form a resonant cavity for laser oscillation with the p-n junction region 30. The radius of curvature of face 39 is properly selected so that the laser resonant cavity defined thereby is unstable when no current is injected. The end face 39 is coated with high reflectivity thin film at the laser wavelength. The end face 38 is either cleaved or polished for laser output.

The laser described herein provides a bistable output controlled by the injection current. At low injection current, the resonant cavity is unstable. Therefore, no laser action is taking place. As the injection current reaches a certain level, the resonant cavity becomes stable due to pump-induced lensing in the active region and laser action occurs. That process completes the switching ON of the device. At that stage, if the injection current is reduced, the resonant cavity will become unstable at a lower injection current when laser action ceases. Such process concludes the OFF switching.

Figure 7A:
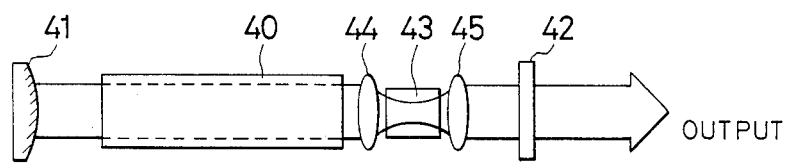
FIGS. 7(a) and 7(b) are schematic illustrations of still other embodiments of the present invention.

FIG. 7(a) shows still another alternate embodiment of the present invention. A homogeneous active medium 40 which exhibits very weak or even no laser-induced lens effect is placed in an optical cavity formed by mirrors 41 and 42. A passive medium 43 showing strong laser-power (or intensity)-dependent lens effect is disposed in the cavity defined by mirrors 41 and 42. Two focusing lenses 44 and 45 are shown in FIG. (7a) are placed with the passive medium 43 sandwiched therebetween to increase laser power density in the passive medium 43 such that laser-induced lens effect in the passive medium 43 is enhanced.

Figure 7B:
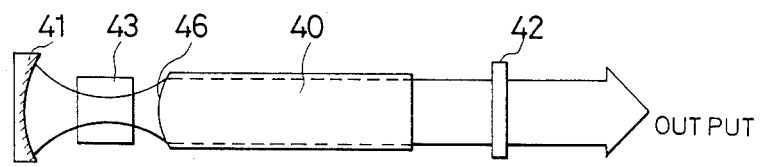

In FIG. 7(b), which also shows another embodiment of the present invention similar in manner to that shown in FIG. 7(a), the lensing enhancement described above is achieved by the curved surfaces 41 and 46.

In the embodiments shown in FIGS. 7(a) and 7(b), the pump-induced lens effect required for bistable operation is provided by the active medium 40, while the laser-induced lens effect is produced in the passive medium 43.

The active medium may be made of a gas (e.g., $CO_2$, He and $N_2$ and their mixtures), liquid (e.g. dye solution) or solid (e.g. $Ti^{3+}$- and $Cr^{3+}$-doped fluoride crystals). The passive medium 43 may likewise be made of a gas (e.g. $CS_2$, liquid (e.g. Nitrobenzene), or solid (e.g. $LiNbO_3$).

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. An optical bistable device comprising:
    (a) an optical resonator capable of resonating a laser beam therein when said resonator has a stable geometry and incapable of resonating the same therein when said resonator has an unstable geometry, wherein said resonator includes means for changing from a stable geometry to an unstable geometry according to a change in intensity of said laser beam and magnitude of input energy supplied to said optical resonator,
    (b) a pair of mirrors,
    (c) an internal refractive medium disposed between said optical resonator and pair of mirrors,
    (d) a light emitting substance placed in said optical resonator for emitting simulated light upon receiving a supply of the input energy wherein said simulated light forms a laser beam when resonated by said optical resonator, and the intensity of said laser beam depends upon the magnitude of the input energy;
    (e) means for suppying said resonator and said light emitting substance with the input energy; and
    (d) means for increasing and decreasing the magnitude of the input energy over first and second prescribed values, wherein the first prescribed value of the input energy is a value at which the resonator changes from a stable geometry to an unstable geometry when sufficient input energy exists for laser action to occur under the stable geometry, and the second prescribed value of the input energy is a value at which the resonator changes from an unstable geometry to a stable geometry under the same condition mentioned above.

2. The optical bistable device of claim 1 wherein at least one of said mirrors is a high reflectivity thin film coated on the end face of the internal refractive medium along an optical axis.

3. An optical bistable device of claim 2 wherein said internal refractive medium comprises a semiconductor material, and said light emitting substance comprises electrons included in the semiconductor material wherein the electrons are capable of making the transition between a conduction band and a valence band whose energy gap corresponds to the frequency of the laser beam.

4. The optical bistable device of claim 1 wherein said resonator includes means for changing from an unstable geometry to a stable geometry according to a change in the magnitude of input energy supplied to said optical resonator.

5. A method for providing optical bistability using a laser system having an optical resonator including a pair of mirrors and an internal refractive medium disposed therebetween wherein said optical resonator is capable of resonating a laser beam therein when said resonator has a stable geometry and incapable of resonating the same therein when said resonator has an unstable geometry, and wherein said resonator is capable of changing from a stable geometry to an unstable geometry according to a change in the intensity of said laser beam and magnitude of input energy supplied to said optical resonator, said method comprising the steps of:
    (a) supplying the input energy to the resonator having a stable geometry in order to excite the laser beam, wherein the intensity of the laser beam depends upon the input energy;
    (b) increasing the input energy so that the resonator changes from the stable geometry to the unstable geometry according to the change in the intensity of said laser beam and magnitude of input energy, resulting in the cessation of laser action at a first prescribed value of the input energy;
    (c) decreasing the input energy so that the resonator changes from the unstable geometry to the stable geometry according to the change in the magnitude of input energy, resulting in the resumption of laser action at a second prescribed value of the input energy;
whereby an output beam of the laser system exhibits hysteresis when the input energy is increased and decreased over the first and second prescribed values.

6. A method for providing optical bistability using a laser system having an optical resonator including a pair of mirrors and an internal refractive medium therebetween wherein said optical resonator is capable of resonating a laser beam therein when said resonator has a stable geometry and incapable of resonating the same therein when said resonator has an unstable geometry and wherein said resonator is capable of changing from a stable geometry to an unstable geometry according to a change in the intensity of said laser beam and magnitude of input energy supplied to said optical resonator, said method comprising the steps of:
    (a) supplying the input energy into said resonator having an unstable geometry,
    (b) increasing the input energy so that said resonator changes from the unstable geometry to stable geometry according to the change in the magnitude of input energy, resulting in the initiation of laser action at a second prescribed value of the input energy, and (c) decreasing the input energy so that the resonator changes from a stable geometry to an unstable geometry according to a change in the intensity of the laser beam and magnitude of input energy, resulting in the cessation of laser action at a first prescribed value of the input energy;

whereby an output beam of the laser system exhibits hysteresis when the input energy is increased and decreased over the first and second prescribed values.

7. An optical bistable device comprising:

(a) an optical resonator comprising, a pair of mirrors facing and separated from each other, and an internal refractive medium disposed between the mirrors wherein said internal refractive medium is capable of having a finite focal length changeable according to a change in an input power Pin and a laser power Pls, owing to the fact that the focal length varies according to the change in the amount of heat generated in the refractive medium due to absorption of the input power Pin and laser power Pls, and wherein cavity parameters of the optical cavity $g_1$ and $g_2$ are given by $g_1=(1-L_1/f-L_0/R)$ and $g_2=(1-L_2/f-L_0/R)$ where $L_0=L_1+L_2-L_1L_2/f$, $L_1$ and $L_2$ are effective spacing between the internal refractive medium and mirrors, and $R_1$ and $R_2$ are radii of curvature of the mirrors, so that when Pin and Pls take values corresponding to $0<g_1g_2<1$, a cavity configuration is optically stable and laser action is capable of taking place, and when Pin and Pls take values corresponding to $g_1g_2<0$ or $g_1g_2>1$ the cavity configuration is optically unstable and laser action is incapable of taking place;

(b) a light emitting substance placed in said optical cavity for emitting stimulated light upon receiving said supplies of input power wherein said stimulated light forms laser light when resonated by said optical resonator and the laser power Pls depends upon the input power Pin;

(c) input means for inputting the input power into said internal refractive medium and said light emitting substance;

(d) means for increasing and decreasing the input power Pin over first and second prescribed values wherein the first prescribed value of the input energy is a value at which the cavity parameters $g_1$ and $g_2$ changes from a value satisfying the relation $0<g_1g_2<1$ to a value satisfying the relation $g_1g_2<0$ or $g_1g_2>1$ through change of the focal length f depending upon Pin or Pls under the condition that a sufficient input energy is input such that a laser action occurs when the parameter $g_1$ and $g_2$ satisfy the relation $0<g_1g_2<1$, and the second prescribed value of the input energy is a value at which the cavity parameter $g_1$ and $g_2$ changes from a value satisfying the relation $g_1g_2<0$ or $g_1g_2>1$ to a value satisfying the relation $0<g_1g_2<1$ through change of the focal length f depending upon Pin, whereby an output beam of the optical resonator exhibits hysteresis when the magnitude of said input power Pin is increased and decreased over first and second prescribed values.

8. The optical bistable device of claim 7, wherein the change in the focal length of the internal refractive medium is due to the distortion of the shape of the medium.

9. The optical bistable device of claim 8, wherein said internal refractive medium comprises a solid medium whose refractive index is different from unity, said light emitting substance comprises at least one of the atoms and ions having energy levels whose separations of energy correspond to the frequency of said laser beam, and said light emitting substance is embedded in the solid medium.

10. The optical bistable device of claim 9, wherein said internal refractive medium is a member selected from the group of crystals consisting of YAG, GGG, Ruby, and GSGG.

11. The optical bistable device of claim 7, wherein said mirrors comprise a Fabry-Perot resonator.

12. The optical bistable device of claim 7 wherein said internal refractive medium comprises a non-lasing solid medium whose focal length will depend upon the input power Pin and the laser power Pls.

13. The optical bistable device of claim 12, further comprising a focusing lens placed within said non-lasing solid medium between said focusing lens and one of said mirrors to increase laser power density in said non-lasing solid medium.

14. The optical bistable device of claim 12, further comprising a pair of focusing lenses placed within said non-lasing solid medium therebetween to increase laser power density in said non-lasing solid medium.

15. An optical bistable device of claim 7, wherein an input means for inputting the input energy comprises a light source which emits an incoherent light.

16. An optical bistable device of claim 7 where said internal refractive medium comprises a liquid medium.

17. A method for providing optical bistability using a laser system having an internal refractive medium within an optical cavity defined by mirrors of an optical resonator wherein said internal refractive medium has a focal length f changeable according to a change in an input power Pin input into the cavity from pumping means and a laser power Pls excited in the cavity, owing to the fact that the focal length varies according to the change in the amount of heat generated in the refractive medium due to absorption of the electromagnetic energy and wherein cavity parameters of the optical cavity $g_1$ and $g_2$ are given by $g_1=(1-L_1/f=L_0/R)$ and $g_2$ $(1-L_2/f-L_0/R)$ where $L_0=L_1+L_2-L_1L_2/f$, $L_1$ and $L_2$ are effective spacing between the internal refractive medium and mirrors, and $R_1$ and $R_2$ are radii of curvature of the mirrors, so that when Pin and Pls take values corresponding to $0<g_1g_2<1$, a cavity configuration is optically stable and laser action is capable of taking place, and when Pin and Pls take values corresponding to $g_1g_2<0$ or $g_1g_2>1$ the cavity configuration is optically unstable and laser action is incapable of taking place, said method comprising the steps of:

(a) inputting the input power into the optical resonator to excite a laser light in the cavity wherein laser power Pls depends upon the input power Pin, and the cavity parameter $g_1$ and $g_2$ satisfying the relation $0<g_1g_2<1$;

(b) increasing the input power Pin so that the cavity parameter $g_1$ and $g_2$ change according to the change in the input power Pin through change of the focal length of the internal refractive medium f depending upon Pin and Pls, resulting in that the cavity parameters $g_1$ and $g_2$ changes from a value satisfying the relation $0<g_1g_2<1$ to a value satisfying the relations $g_1g_2<0$ or $g_1g_2>1$, at first prescribed value of the input power Pin, so that the laser action is ceased at the same value of Pin; and (c) decreasing the input power Pin so that the cavity parameter $g_1$ and $g_2$ change according to the change in the input power Pin through change of the focal length of the internal refractive medium depending upon Pin, resulting in that the cavity parameters $g_1$ and $g_2$ change from a value satisfying the relations $g_1g_2<0$ or $g_1g_2>1$ to a value satisfying the relation $0<g_1g_2<1$, at a second prescribed value of the input power, so that the laser action is resumed at the same value of Pin, whereby an output beam of the optical resonator exhibits hysteresis when the magnitude of said input power Pin is increased and decreased over the first and second prescribed values.

18. A method for providing optical bistability using a laser system having an internal refractive medium within an optical cavity defined by mirrors of an optical resonator wherein said internal refractive medium has a focal length f changeable according to the change in an input power Pin input into the cavity from pumping means and a laser power Pls excited in the cavity, owing to the fact that the focal length varies according to the change in the amount of the heat generated in the refractive medium due to absorption of the electromagnetic energy, and wherein cavity parameters of the optical cavity $g_1$ and $g_2$ are given by $g_1=(1-L_1/f-L_0/R)$ and $g_2$ $(1-L_2/f-L_0/R)$ where $L_0=L_1+L_2-L_1L_2/f$, $L_1$ and $L_2$ are effective spacing between the internal refractive medium and mirrors, and $R_1$ and $R_2$ are radii of curvature of the mirrors, so that when Pin and Pls take values corresponding to $0<g_1g_2<1$, a cavity confiruration is optically stable and laser action is capable of taking place, and when Pin and Pls take values corresponding to $g_1g_2<0$ or $g_1g_2>1$ the cavity configuration is optically unstable and laser action is incapable of taking place, said method comprising the steps of:

(a) inputting the power into an optical resonator, wherein the cavity parameters $g_1$ and $g_2$ satisfy the relation $g_1g_2<0$ or $g_1g_2<1$, so that laser action does not take place;

(b) increasing the input power Pin so that the cavity parameters $g_1$ and $g_2$ change according to a change in input power Pin through a change of the focal length of the internal refractive medium f depending upon Pin, resulting in that the cavity parameter changes from a value satisfying the relation $g_1g_2<0$ or $g_1g_2>1$ to a value satisfying the relation $0<g_1g_2<1$, at a second prescribed value of Pin, so that laser action is commenced at the same value of Pin; and (c) decreasing the input power Pin so that the cavity parameters $g_1$ and $g_2$ change according to the change in the input power Pin through a change of the focal length of the internal refractive medium f depending upon Pin and Pls resulting in that the cavity parameter $g_1$ and $g_2$ change from a value satisfying the relation $0<g_1g_2<1$ to a value satisfying the relation $g_1g_2<0$ or $g_1g_2>1$, at a first prescribed value of the input power Pin, so that the laser action is ceased at the same value of Pin whereby an output beam of the optical resonator exhibits hysteresis when the magnitude of said input power Pin is increased and decreased over the first and second prescribed values.

* * * * *